E. G. COOK.
PROCESS OF MAKING COMPOUND HOLLOW METAL BODIES.
APPLICATION FILED FEB. 14, 1912.

1,063,417.

Patented June 3, 1913.

Witnesses:
H. D. Penney
Peter Henry

Inventor:
Edward G. Cook,
By his Attorney,
F. H. Richards

UNITED STATES PATENT OFFICE.

EDWARD G. COOK, OF BROOKLYN, NEW YORK, ASSIGNOR TO BRASS & COPPER PRODUCTS COMPANY, OF NEW YORK, N. Y.

PROCESS OF MAKING COMPOUND HOLLOW METAL BODIES.

1,063,417.

Specification of Letters Patent. Patented June 3, 1913.

Application filed February 14, 1912. Serial No. 677,507.

*To all whom it may concern:*

Be it known that I, EDWARD G. COOK, a citizen of the United States, residing in Brooklyn, New York, in the county of Kings and State of New York, have invented certain new and useful Improvements in Processes of Making Compound Hollow Metal Bodies, of which the following is a specification.

My present improvement relates to a process of manufacture of articles comprised of hollow or tubular metal bodies.

For the purpose of illustrating forms that may be made by my process and also to bring out the utility thereof, I have shown in the accompanying drawings, a tubular body known as a water jacketed gas engine manifold.

One of the advantages of articles made by this process is that the walls can be thinner than is customarily obtained by the usual method of casting.

A further advantage of this process is that hollow or tubular bodies requiring a plurality of walls may be made thereby, it being impossible or impracticable to make such bodies by any other known method.

A further advantage of articles made by my process is that they are light and with proper care in the process of making, strength is made consistent with lightness.

Figure 1:
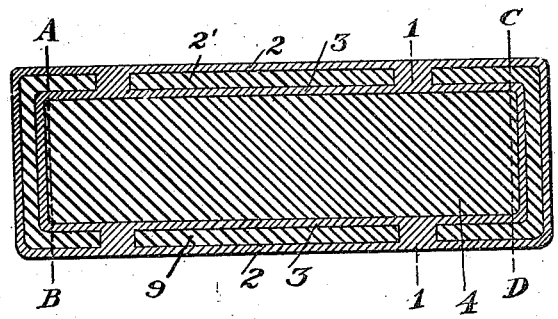
Figure 2:
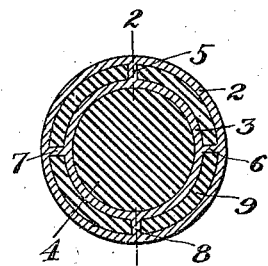
Figure 3:
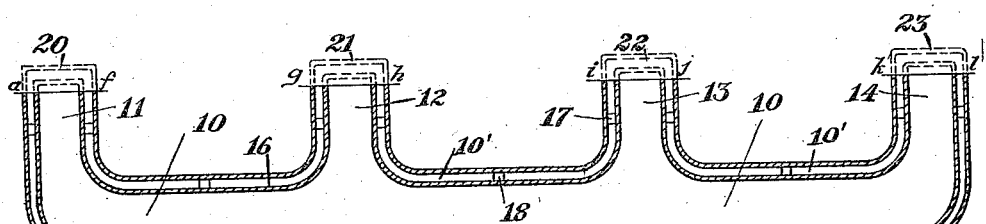
Figure 4:
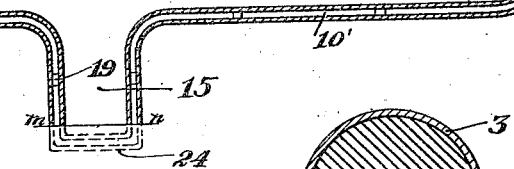
Figure 5:
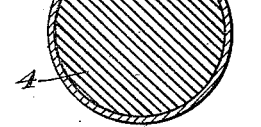

In the accompanying drawings, Figure 1 is a sectional view of an article made by my process taken on the line 2—2, Fig. 2, Fig. 2 is a sectional view taken on the line 1—1, Fig. 1, Fig. 3 is a sectional view of a manifold, Fig. 4 is a sectional view of a modification of Fig. 2, and Fig. 5 is a sectional view of another modification.

As one indication of the construction that may be made by my process, there is shown in Fig. 1 a longitudinal section of two hollow metal bodies 2 and 3, which, as shown in Fig. 2, may be cylindrical, although the shape there shown may be of any section desired. In the interior is shown a core or forming member 4 which is comprised of a plastic material or compound which may be of wax or any material of like nature, the said material being so cast in a mold or being formed by hand that its outer contour may be used to shape the metal article desired.

In the present case in Figs. 1 and 2 the object to be made is comprised of two metal tubes being held apart in normally relative positions to one another by means of chaplets 5, 6, 7 and 8. The core form 4 after being properly shaped is coated with a light metallic powder, such as graphite or bronze powder, to form a conductive surface thereon, and is immersed in the well known copper bath and is caused to have coated thereon, by an electric current, a deposit of copper. This process is continued until the desired thickness of wall 3 is obtained as shown in Fig. 5. The article is then removed from the bath and is coated on the outside with another coating 9 of a compound similar to that used for the core form 4. This will form or the outside of the tubular member 3 another master or core form 2' and after cutting pockets in various places in the said form 9, so as to permit the chaplets 5, 6, 7 and 8 to be formed, the article is then re-immersed in the copper bath and coating repeated until the wall 2 of the desired thickness is formed externally thereon. The tubes are then cut through at the points AB and CD, Fig. 1, and the article may then be immersed in hot water, this causing the core to become fluid and leaving two cylindrical bodies relatively fixed to one another and ready for any purpose that may be required.

As an indication of some of the more complicated forms that may be made by this process, there is shown in Fig. 3 a carbureter intake manifold for gas engines which is arranged so that the inner passageway 10 which connects the four passageways 11, 12, 13 and 14, is a passage for distributing gas to four separate cylinders, and the single passageway 15 is designed to lead to the carbureter. As is well known in carbureting gasolene for engines that the mixing of air and gasolene to make an explosive charge, reduces the temperature of air surrounding the intake pipe to such an extent that the pipe sometimes becomes frosted and to overcome this difficulty a water jacketed manifold is used that is so arranged as to permit the circulation of the heated water from the engine water jackets to flow around the said intake pipe. The customary method of making this manifold heretofore has been by the well known foundry method of casting and the principal objection to this class of work is the unevenness of the walls, together with the great weight of the same, it being impossible to cast as thin a wall as could be used.

The core form for the manifold shown in Fig. 3 is made in the usual style, and in manufacturing, a mold for these core forms may be made so that the work resulting therefrom would be of uniform dimensions and after the process of depositing the first or inner wall 16 has been concluded, the shell formed thereby is coated as described for Fig. 1, and treated at the points 17, 18 and 19, so as to obtain chaplets or holding members between the two tubular members, and then the outer shell is deposited upon the second core form, which is comprised of the inner core form, its metal coating and the plastic coating on the exterior thereof. This procedure, as in the case of Fig. 1, would leave a metal body inclosed all around as indicated at the ends 20, 21, 22, 23, and 24.

For the purpose of removing the interior plastic forms from the gas passageway 10 and the water passageway 10', the ends are cut on the lines indicated by $af$, $gh$, $ij$, $kl$ and $mn$, thereby forming a double walled manifold for the purpose described.

Additional treatment may be required to put this manifold in condition for use on a gas engine, such as attaching at the cut points, by means of brazing, attaching flanges, but they are not shown in the present drawing for the reason that they form no part of the process.

It is obvious that any of the articles made by the above noted process can be treated by polishing and buffing, so that they may have a smooth satin finish, or highly polished surfaces. It is also obvious that devices of this class may be made to have walls of metal of thinner proportions than has heretofore been possible by any other method now used.

As a further indication of the possibilities of this process in manufacturing articles of the class previously described, I have shown in Fig. 4 where the process has been continued one step further, wherein the second tubular member has been coated and a third metal member formed thereon having this chaplet attaching means therebtween, thereby forming a three walled tubular member comprised of walls 25, 26 and 27, the said walls forming thereby, the passageways 28, 29 and 30. If a manifold shown in Fig. 3 were constructed according to the section shown in Fig. 4, the passageway 28 could be used as a gas conducting passage, the passageway 29 being used as a water jacketed passageway, and the passage 30 may be filled with an insulating compound, such as asbestos and magnesia which might be applied in the fluid state and left thereafter to set.

Having thus described my invention, I claim:

1. A process for making hollow metal bodies consisting of forming a body of plastic material in the desired shape and electro-depositing a coating of metal upon the said form, then forming a body of plastic material upon said metal coating and electro-depositing upon said second plastic material another coating of metal.

2. A process of making hollow metal bodies consisting in shaping a body of plastic material to the desired contour, and electro-depositing a film of metal upon said form, and then coating the metal body formed thereby with a covering of plastic material of the desired thickness, and forming notches thereon in desired places in the said coating, said notches being formed by the removal of said plastic coating until the metal of the first said coating is exposed, and then coating the said plastic body with a covering of metal of the desired thickness by electro-deposition, the said notches cut into the said plastic coating thereby forming connecting members or chaplets between the two said metal bodies.

3. A process of making hollow metal bodies consisting in forming a body of plastic material of the desired contour, and electro-depositing a film of metal upon said form, and then coating the metal body formed thereby with a covering of plastic material of the desired thickness, and forming notches thereon in desired places in the said coating, said notches being formed by the removal of said plastic coating until the metal of the first said coating is exposed, and then coating the said plastic body with a covering of metal of the desired thickness by electro-deposition, the said notches cut into the said plastic coating thereby forming connecting members or chaplets between the two said metal bodies, the two attaching metal bodies formed thereby being then cut at pre-determined places and being immersed in boiling water thereby to remove the plastic core forms and leaving a pair of connected tubular members.

4. A process of making hollow metal bodies, comprised of a plurality of metal bodies, one inside the other and of like contour, consisting of molding a plastic material like wax into the desired shape of the first or interior body, and electro-depositing thereon a coating of metal and covering the body of metal formed thereby with a coating of like plastic material, and providing openings in said plastic material at the desired points and coating the said plastic wall with a coating of metal by electro-deposition, and again coating the formed metal body with a coating of plastic material of requisite thickness and providing openings in the second said plastic wall at the desired points, and again coating the said second plastic form with an outer coating of metal by electro-deposition, the said openings formed in the two said outer plastic walls affording connecting means respectively between two of the said walls, and then cutting off the ends of the metal bodies formed thereby at pre-determined points and immersing the said bodies in a boiling fluid thereby causing the said plastic material to become fluid and leaving a three walled metal body.

5. A process for making hollow metal bodies consisting of electro-depositing a metal coating upon a plastic core form and then by successive coatings of plastic material and electro-depositing of metal thereon, to form a multi-walled hollow metal body.

6. A process for making compound hollow metal bodies, consisting of electro-depositing a metal coating upon a plastic core form and then by successive coatings of plastic material and electro-depositing of metal to form a multi-walled hollow body, said walls being connected together by means of chaplets.

7. A process for making compound hollow metal bodies, consisting of electro-depositing a metal coating upon a core form and then by successive coatings of plastic material and electro-depositing of metal on a multi-walled hollow metal body, said walls being connected together by means of chaplets formed of electro-deposited metal, openings being provided in the plastic cores between said walls thereby to form said chaplets, and cutting off the ends of said metal bodies at certain pre-determined places and immersing the article in boiling water, thereby causing the plastic material to become fluid and be thereby removed and leaving a plural walled hollow metal body, said plurality of metal bodies being relatively connected to one another.

8. A process for making hollow metal bodies comprised of a plurality of metal bodies one inside the other and of like contour consisting of molding into the desired shape a core form comprised of fusible material of low melting point, and electro-depositing thereon a coating of metal and then covering the body of metal formed thereby with a covering of like fusible material, and then covering the same with a coating of electro-deposited metal and again coating the said outer metal body with another coating of fusible material, another coat of metal being electro-deposited thereon and then cutting off the ends of the metal bodies formed thereby and therein at predetermined points and fusing out the said core forms thereby leaving a plurality of hollow metal bodies of like contour one inside the other.

EDWARD G. COOK.

Witnesses:
 HAROLD P. PENNEY,
 JOHN MORRIS.